(12) United States Patent
Lee et al.

(10) Patent No.: US 8,778,524 B2
(45) Date of Patent: Jul. 15, 2014

(54) ELECTROCHEMICAL DEVICE WITH IMPROVED CYCLE CHARACTERISTICS

(75) Inventors: Joo-Sung Lee, Daejon (KR); Jang-Hyuk Hong, Daejeon (KR); Jong-Hun Kim, Daejeon (KR); Bo-Kyung Ryu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/524,169

(22) Filed: Jun. 15, 2012

(65) Prior Publication Data

US 2012/0251869 A1     Oct. 4, 2012

Related U.S. Application Data

(63) Continuation of application No. PCT/KR2011/007035, filed on Sep. 23, 2011.

(30) Foreign Application Priority Data

Oct. 5, 2010  (KR) .................. 10-2010-0096839
Sep. 21, 2011 (KR) .................. 10-2011-0095272

(51) Int. Cl.
*H01M 2/16*    (2006.01)
*H01M 2/18*    (2006.01)

(52) U.S. Cl.
USPC .......................................... 429/144; 429/142

(58) Field of Classification Search
USPC ................................. 429/144, 142
See application file for complete search history.

(56) References Cited

U.S. PATENT DOCUMENTS

2006/0008700 A1*  1/2006  Yong et al. .................. 429/144
2007/0281206 A1* 12/2007  Fujikawa et al. .............. 429/62
2008/0241697 A1  10/2008  Imachi

FOREIGN PATENT DOCUMENTS

| JP | 11-149912 | 6/1999 |
| JP | 11-176419 | 7/1999 |
| JP | 2008-270160 A | 11/2008 |
| KR | 1020020080797 | 10/2002 |
| KR | 1020040042749 | 5/2004 |
| KR | 102007001958 | 2/2007 |
| KR | 1020090012134 | 2/2009 |
| KR | 1020100072825 | 7/2010 |
| WO | WO 2009014388 A2 * | 1/2009 |

OTHER PUBLICATIONS

International Search Report PCT/KR2011/007035 dated Apr. 20, 2012.

* cited by examiner

*Primary Examiner* — Matthew Merkling
(74) *Attorney, Agent, or Firm* — Lerner, David, Littenberg, Krumholz & Mentlik, LLP

(57) ABSTRACT

Disclosed is an electrochemical device. The electrochemical device includes: (a) a composite separator including a porous substrate, a first porous coating layer coated on one surface of the porous substrate, and a second porous coating layer coated on the other surface of the porous substrate; (b) an anode disposed to face the first porous coating layer; and (c) a cathode disposed to face the second porous coating layer. The first and second porous coating layers are each independently composed of a mixture including inorganic particles and a binder polymer. The first porous coating layer is thicker than the second porous coating layer. The electrochemical device has good thermal stability and improved cycle characteristics.

10 Claims, 1 Drawing Sheet

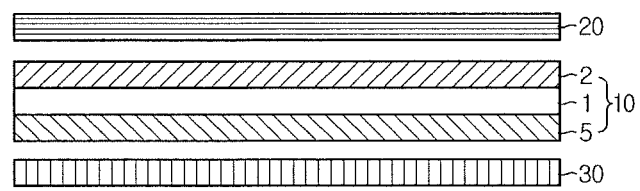

ELECTROCHEMICAL DEVICE WITH IMPROVED CYCLE CHARACTERISTICS

CROSS-REFERENCE TO RELATED APPLICATION

This application a continuation of International Application No. PCT/KR2011/007035 filed Sep. 23, 2011, which claims priority under 35 USC 119(a) to Korean Patent Application Nos. 10-2010-0096839 and 10-2011-0095272 filed in the Republic of Korea on Oct. 5, 2010 and Sep. 21, 2011, respectively, the entire contents of which are incorporated herein by reference.

TECHNICAL FIELD

The present disclosure relates to an electrochemical device, such as a lithium secondary battery, and more particularly to an electrochemical device including a composite separator in which porous coating layers including a mixture of inorganic particles and a binder polymer are coated on a porous substrate.

BACKGROUND ART

There has recently been growing interest in energy storage technologies. As the application fields of energy storage technologies have been extended to mobile phones, camcorders, notebook computers and even electric cars, efforts have increasingly been made towards the research and development of electrochemical devices. In this aspect, electrochemical devices have attracted the most attention. The development of secondary batteries capable of repeatedly charging and discharging has been the focus of particular interest. In recent years, extensive research and development has been conducted to design new electrodes and batteries for the purpose of improving capacity density and specific energy of the batteries.

Many secondary batteries are currently available. Lithium secondary batteries developed in the early 1990's have received a great deal of attention due to their advantages of higher operating voltages and much higher energy densities than conventional aqueous electrolyte-based batteries, such as Ni-MH batteries, Ni—Cd batteries, and $H_2SO_4$—Pb batteries. However, such lithium ion batteries suffer from safety problems, such as fire or explosion, encountered with the use of organic electrolytes and are disadvantageously complicated to fabricate. In attempts to overcome the disadvantages of lithium ion batteries, lithium ion polymer batteries have been developed as next-generation batteries. However, additional research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to ensure the safety of such electrochemical devices. The most important consideration for safety is that operational failure or malfunction of electrochemical devices should not cause injury to users. For this purpose, safety regulations strictly restrict the possibilities of dangers (such as fire and smoke) of electrochemical devices. Overheating of an electrochemical device may cause thermal runaway or puncture of a separator may pose an increased risk of explosion. In particular, porous polyolefin substrates commonly used as separators for electrochemical devices undergo extreme thermal shrinkage at a temperature of 100° C. or higher due to their material characteristics and production processes including elongation. This thermal shrinkage behavior may cause short circuits between a cathode and an anode.

Various proposals have been made to solve the above safety problems of electrochemical devices. For example, Korean Unexamined Patent Publication No. 2007-0019958 discloses a composite separator including a porous substrate and a porous coating layer coated on at least one surface of the porous substrate wherein the porous coating layer is composed of a mixture of inorganic particles and a binder polymer. The inorganic particles present in the porous coating layer coated on the porous substrate serve as spacers that can maintain a physical shape of the porous coating layer to inhibit the porous substrate from thermal shrinkage when an electrochemical device overheats. Interstitial volumes present between the inorganic particles form fine pores of the porous coating layer.

The composite separator is interposed between a cathode and an anode to fabricate an electrochemical device. The capacity of the electrochemical device tends to deteriorate to a considerable extent with increasing numbers of cycles.

DISCLOSURE

Technical Problem

The present disclosure is designed to solve the problems of the prior art, and therefore it is an object of the present disclosure to provide an electrochemical device in which porous coating layers are introduced onto a porous substrate to achieve good thermal stability and improved cycle characteristics.

Technical Solution

In order to achieve the above object, there is provided an electrochemical device including:

(a) a composite separator including a porous substrate, a first porous coating layer coated on one surface of the porous substrate and composed of a mixture including inorganic particles and a binder polymer, and a second porous coating layer coated on the other surface of the porous substrate and composed of a mixture including inorganic particles and a binder polymer, wherein the first porous coating layer is thicker than the second porous coating layer;

(b) an anode disposed to face the first porous coating layer; and (c) a cathode disposed to face the second porous coating layer.

In the present disclosure, it is preferred that the thicknesses of the first and second porous coating layers satisfy the following relationship 1:

$$0.1 \le (T_1-T_2)/T_{tot} 0.8 \quad (1)$$

wherein $T_1$ and $T_2$ represent the thicknesses of the first and second porous coating layers, respectively, and $T_{tot}$ represents the total thickness of the first and second porous coating layers.

In the present disclosure, it is more preferred that the thicknesses of the first and second porous coating layers satisfy the following relationship 2:

$$0.2 \le (T_1-T_2)/T_{tot} \le 0.7 \quad (2)$$

wherein $T_1$ and $T_2$ represent the thicknesses of the first and second porous coating layers, respectively, and $T_{tot}$ represents the total thickness of the first and second porous coating layers.

In the present disclosure, it is preferred that the total thickness of the first and second porous coating layers is from 1.0 to 20.0 μm.

In the present disclosure, it is preferred that the porous substrate is a porous polyolefin membrane and has a thickness of 1 to 100 μm.

In the present disclosure, it is preferred that the cathode includes particles of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z represent the atomic fractions of the corresponding constituent elements of the oxide and satisfy the relations of $0 \leq x < 0.5$, $0 \leq y < 0.5$, $0 \leq z < 0.5$) or a mixture thereof as a cathode active material. It is preferred that the anode includes particles of natural graphite, artificial graphite, a carbonaceous material, LTO, silicon (Si), tin (Sn) or a mixture thereof as an anode active material.

Advantageous Effects

The electrochemical device of the present disclosure exhibits the following characteristics.

First, the porous coating layers function to inhibit the porous substrate from thermal shrinkage when the electrochemical device overheats and to prevent short circuits between both electrodes when thermal runaway takes place.

Second, the arrangement of the composite separator, in which the first porous coating layer thicker than the second porous coating layer is disposed to face the anode, can reduce the actual transport rate of ions through the anode surface, where side reactions occur more severely than in the cathode, thus leading to an improvement in the cycle characteristics of the electrochemical device. That is, capacity deterioration of the electrochemical device of the present disclosure can be prevented, compared to an electrochemical device employing a composite separator including a first porous coating layer and a second porous coating layer with the same thickness or an electrochemical device in which a first porous coating layer thicker than a second porous coating layer is disposed to face a cathode.

DESCRIPTION OF DRAWINGS

Other objects and aspects of the present disclosure will become apparent from the following descriptions of the embodiments with reference to the accompanying drawing in which:

FIG. 1 is an exploded cross-sectional view schematically illustrating the configuration of a cathode, an anode and a composite separator in an electrochemical device of the present disclosure.

BEST MODE

Hereinafter, preferred embodiments of the present disclosure will be described in detail with reference to the accompanying drawing. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The present disclosure provides an electrochemical device including (a) a composite separator including a porous substrate, a first porous coating layer coated on one surface of the porous substrate and composed of a mixture including inorganic particles and a binder polymer, and a second porous coating layer coated on the other surface of the porous substrate and composed of a mixture including inorganic particles and a binder polymer, wherein the first porous coating layer is thicker than the second porous coating layer, (b) an anode disposed to face the first porous coating layer, and (c) a cathode disposed to face the second porous coating layer.

FIG. 1 is an exploded cross-sectional view schematically illustrating the configuration of a cathode 30, an anode 20 and a composite separator 10 in an electrochemical device according to an embodiment of the present disclosure.

Referring to FIG. 1, the composite separator 10 includes a porous substrate 1, a first porous coating layer 2 coated on one surface of the porous substrate 1, and a second porous coating layer 5 coated on the other surface of the porous substrate 1. The first porous coating layer 2 and the second porous coating layer 5 coated on both surfaces of the porous substrate 1 are each independently composed of a mixture including inorganic particles and a binder polymer. The inorganic particles present in each of the porous coating layers 2 and 5 serve as spacers that can maintain a physical shape of the porous coating layers 2 and 5 to inhibit the porous substrate 1 from thermal shrinkage when the electrochemical device overheats or to prevent short circuits between both electrodes of the electrochemical device when thermal runaway takes place. It is preferred that interstitial volumes present between the inorganic particles become fine pores of the porous coating layers. The thickness of the first porous coating layer 2 is larger than that of the second porous coating layer 5.

The anode 20 and the cathode 30 are disposed so as to face the first porous coating layer 2 and the second porous coating layer 5 of the composite separator 10, respectively.

The arrangement of the composite separator 10, in which the first porous coating layer 2 thicker than the second porous coating layer 5 is disposed to face the anode, can reduce the actual transport rate of ions through the anode surface, where side reactions occur more severely than in the cathode, thus leading to an improvement in the cycle characteristics of the electrochemical device. That is, capacity deterioration of the electrochemical device of the present disclosure can be prevented, compared to an electrochemical device employing a composite separator including a first porous coating layer and a second porous coating layer with the same thickness or an electrochemical device in which a first porous coating layer thicker than a second porous coating layer is disposed to face a cathode.

In the electrochemical device of the present disclosure, it is preferred that the thicknesses of the first and second porous coating layers satisfy the following relationship 1:

$$0.1 \leq (T_1 - T_2)/T_{tot} \leq 0.8 \tag{1}$$

wherein $T_1$ and $T_2$ represent the thicknesses of the first and second porous coating layers, respectively, and $T_{tot}$ represents the total thickness of the first and second porous coating layers. The total thickness of the first and second porous coating layers is preferably from 1.0 to 20.0 μm.

It is more preferred that the thicknesses of the first and second porous coating layers satisfy the following relationship 2:

$$0.2 \leq (T_1 - T_2)/T_{tot} \leq 0.7 \tag{2}$$

wherein $T_1$ and $T_2$ represent the thicknesses of the first and second porous coating layers, respectively, and $T_{tot}$ represents the total thickness of the first and second porous coating layers.

In the electrochemical device of the present disclosure, the porous substrate may be any of those commonly used in the art, including various porous polymer membranes, for example, porous polyolefin membranes that are currently used as separators of electrochemical devices, particularly, lithium secondary batteries, and non-woven fabrics, for example, those composed of polyethylene phthalate fibers. The material and shape of the porous substrate may vary according to the intended purposes. Examples of suitable materials for the porous polyolefin membranes include: polyethylene polymers, such as high density polyethylene, linear low density polyethylene, low density polyethylene and ultra-high molecular weight polyethylene; polypropylene; polybutylene; and polypentene. These polyolefins may be used alone or as a mixture thereof. Examples of suitable materials for the non-woven fabrics include polyolefins and polymers having higher heat resistance than polyolefins. The thickness of the porous substrate is preferably from 1 to 100 µm, more preferably from 5 to 50 µm, but is not particularly limited to this range. The pore size and porosity of the porous substrate are preferably from 0.001 to 50 µm and from 10 to 95%, respectively, but are not particularly limited to these ranges. The porous substrate is preferably a porous polyolefin membrane.

The inorganic particles included in each of the first and second porous coating layers are not specifically limited so long as they are electrochemically stable. In other words, the inorganic particles can be used without particular limitation in the present disclosure if they do not undergo oxidation and/or reduction in an operating voltage range applied to the electrochemical device (for example, 0-5 V for Li/Li$^+$). In particular, a high dielectric constant of the inorganic particles can contribute to an increase in the degree of dissociation of a salt, for example, a lithium salt, in a liquid electrolyte to improve the ionic conductivity of the electrolyte.

For these reasons, it is preferred that the inorganic particles have a high dielectric constant of at least 5, preferably at least 10. Non-limiting examples of inorganic particles having a dielectric constant of at least 5 include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ and SiC particles. These inorganic particles may be used alone or as a mixture thereof.

The inorganic particles may be those that have the ability to transport lithium ions, that is, those that contain lithium atoms and have the function of transferring lithium ions without storing the lithium. Non-limiting examples of inorganic particles that have the ability to transport lithium ions include lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_yTi_z(PO_4)_3$, $0<x<2$, $0<y<1$, $0<z<3$) particles, (LiAlTiP)$_xO_y$ type glass ($0<x<4$, $0<y<13$) particles such as $14Li_2O$-$9Al_2O_3$-$38TiO_2$-$39P_2O_5$ particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles such as $Li_{3.25}Ge_{0.25}P_{0.75}S_4$ particles, lithium nitride ($Li_xN_y$, $0<x<4$, $0<y<2$) particles such as $Li_3N$ particles, $SiS_2$ type glass ($Li_xSi_yS_z$, $0<x<3$, $0<y<2$, $0<z<4$) particles such as $Li_3PO_4$—$Li_2S$—$SiS_2$ particles, and $P_2S_5$ type glass ($Li_xP_yS_z$, $0<x<3$, $0<y<3$, $0<z<7$) particles such as LiI—$Li_2S$—$P_2S_5$ particles. These inorganic particles may be used alone or as a mixture thereof.

The average particle diameter of the inorganic particles is not limited but is preferably in the range of 0.001 to 10 µm. This range ensures a uniform thickness and an optimal porosity of the coating layer. An average particle diameter of less than 0.001 µm may cause deterioration of dispersibility. Meanwhile, an average particle diameter exceeding 10 µm may increase the thickness of the coating layer.

The binder polymer included in each of the first and second porous coating layers preferably has a glass transition temperature ($T_g$) in the range of −200° C. to 200° C. Within this range, the mechanical properties (e.g., flexibility and elasticity) of the coating layer can be improved.

The binder polymer does not necessarily need to have the ability to conduct ions. However, since the ionic conductivity of the binder polymer can further improve the performance of the electrochemical device, it is preferred that the binder polymer has a dielectric constant as high as possible. In practice, the degree of dissociation of a salt in an electrolyte is dependent on the dielectric constant of a solvent in the electrolyte. Therefore, a higher dielectric constant of the binder polymer can lead to a higher degree of dissociation of a salt in an electrolyte. The dielectric constant of the binder polymer is in the range between 1.0 and 100 (as measured at a frequency of 1 kHz), particularly preferably 10 or above.

Further, impregnation of the binder polymer with a liquid electrolyte allows the binder polymer to be gelled, resulting in a high degree of swelling of the binder polymer. For a high degree of swelling, the binder polymer preferably has a solubility parameter between 15 and 45 Mpa$^{1/2}$, more preferably between 15 and 25 Mpa$^{1/2}$ and between 30 and 45 Mpa$^{1/2}$. Accordingly, a hydrophilic polymer having many polar groups is preferred as the binder polymer over a hydrophobic polymer, such as a polyolefin. A solubility parameter lower than 15 Mpa$^{1/2}$ or exceeding 45 Mpa$^{1/2}$ makes it difficult to swell the binder polymer in a typical liquid electrolyte for a battery.

Non-limiting examples of such binder polymers include polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, and carboxymethyl cellulose. These binder polymers may be used alone or as a mixture of two or more kinds thereof.

The weight ratio between the inorganic particles and the binder polymer included in each of the first and second porous coating layers is preferably in the range of 50:50 to 99:1, more preferably 70:30 to 95:5. If the inorganic particles are present in an amount of less than 50% by weight (i.e. the binder polymer is present in a relatively large amount), the pore size and porosity of the porous coating layer may be reduced. Meanwhile, if the inorganic particles are present in an amount exceeding 99% by weight (i.e. the binder polymer is present in a very small amount), the peeling resistance of the porous coating layer may be deteriorated.

In the electrochemical device of the present disclosure, the cathode and the anode may be those known in the art. Each of the cathode and the anode can be typically produced by preparing a slurry including corresponding electrode active material particles, applying the slurry to a corresponding current collector, and drying the slurry. Examples of preferred cathode active materials for the cathode include, but are not limited to, $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z represent the atomic fractions of the corresponding constituent elements of the oxide and satisfy the relations of $0 \leq x < 0.5$, $0 \leq y < 0.5$, $0 \leq z < 0.5$). These cathode active materials may be used alone or as a mixture of two or more kinds thereof. At least one of $LiCoO_2$ and $LiNiMnCoO_2$ is particularly preferably included in the cathode.

Examples of preferred anode active materials for the anode include, but are not limited to, natural graphite, artificial graphite, carbonaceous materials, LTO, silicon (Si) and tin (Sn). These anode active materials may be used alone or as a mixture of two or more kinds thereof.

There is no restriction on the method for fabricating the electrochemical device of the present disclosure. For example, the electrochemical device may be fabricated by the following procedure.

First, the binder polymer is dissolved in a solvent to prepare a solution, and the organic particles are added to and dispersed in the solution to prepare a slurry. The solvent preferably has a solubility parameter similar to that of the binder polymer and a low boiling point, which are advantageous for uniform mixing and ease of solvent removal. Non-limiting examples of solvents usable to dissolve the binder polymer include acetone, tetrahydrofuran, methylene chloride, chloroform, dimethylformamide, N-methyl-2-pyrrolidone (NMP), cyclohexane, and water. These solvents may be used alone or as a mixture thereof. It is preferred to crush the inorganic particles after addition to the polymer solution. At this time, the crushing is suitably performed for 1 to 20 hr. The inorganic particles are preferably crushed to a particle size of 0.001 to 10 μm. The inorganic particles may be crushed by any suitable technique known in the art. Ball milling is particularly preferred.

Then, the slurry is coated on both surfaces of the porous substrate at a humidity of 10 to 80%, followed by drying to form the porous coating layers with different thicknesses. The porous coating layer having a larger thickness is defined as the first porous coating layer, and the porous coating layer having a smaller thickness is defined as the second porous coating layer.

The slurry can be coated on the porous substrate by suitable techniques known in the art, for example, die coating, roll coating and dip coating. The thicknesses of the porous coating layers can be controlled, for example, by dipping the porous substrate in the slurry to coat both surfaces of the porous substrate with the slurry and adjusting the coating layers to different thicknesses using two Mayer bars having different wire sizes.

The composite separator thus produced is interposed between the cathode and the anode. Specifically, the composite separator is arranged such that the first porous coating layer and the second porous coating layer are disposed to face the anode and the cathode, respectively. There is no particular restriction on the configuration of the composite separator and the electrodes so long as the composite separator is in physical contact with the two electrodes. If desired, the composite separator and the electrodes may be laminated on one another.

The electrochemical device of the present disclosure includes all devices in which electrochemical reactions occur. Specific examples of such electrochemical devices include all kinds of primary batteries, secondary batteries, fuel cells, solar cells, and capacitors such as supercapacitors. Particularly preferred are lithium secondary batteries, including lithium metal secondary batteries, lithium ion secondary batteries, lithium polymer secondary batteries and lithium ion polymer secondary batteries.

The electrochemical device of the present disclosure can be fabricated by suitable methods known in the art. For example, the electrochemical device may be fabricated by sealing the electrode structure consisting of the cathode, the anode and the composite separator in a case, such as a pouch, and injecting an electrolyte into the electrode structure.

The electrolyte electrochemical device of the present disclosure can use an electrolyte consisting of a salt and an organic solvent capable of dissolving or dissociating the salt. The salt has a structure represented by $A^+B^-$ wherein $A^+$ is an alkali metal cation such as $Li^+$, $Na^+$, $K^+$ or a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) and γ-butyrolactone. These organic solvents may be used alone or as a mixture thereof.

The electrolyte may be injected in any suitable step during fabrication of the electrochemical device depending on the manufacturing processes and desired physical properties of a final product. Specifically, the electrolyte may be injected before battery assembly or in the final step of battery assembly.

MODE FOR DISCLOSURE

Hereinafter, embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLES

Example 1

Production of Composite Separator

Polyvinylidene fluoride-co-trifluorochloroethylene (PVdF-CTFE) and cyanoethylpullulan in a weight ratio of 10:2 were added to and dissolved in acetone at 50° C. for at least about 12 hr. A mixture of $Al_2O_3$ powder and $BaTiO_3$ powder in a weight ratio of 9:1 was added to the polymer solution such that the weight ratio of the polymer to the inorganic particles was 10:90. The inorganic particles were crushed by ball milling for 12 hr and dispersed in the solution to prepare a slurry. The inorganic particles of the slurry were measured to have an average particle diameter of 600 nm.

A 9 μm thick porous polyethylene membrane (ND209, Asahi) was dipped in the slurry to coat both surfaces thereof with the slurry. The thicknesses of the coating layers were controlled using two Mayer bars having wire sizes of 0.5 mm and 0.7 mm. The solvent was removed by drying to form two porous coating layers having thicknesses of 4.2 μm (first porous coating layer) and 2.6 μm (second porous coating layer). The difference in thickness between the first coating layer ($T_1$) and the second coating layer ($T_2$) was divided by the total thickness of the two coating layers ($T_{tot}$). The calculated value $(T_1-T_2)/T_{tot}$ was about 0.24.

Fabrication of Battery

The composite separator was interposed between a cathode coated with $LiCoO_2$ particles as cathode active material particles and an anode composed of a copper (Cu) thin film coated with graphite particles, as anode active material particles, coated on the copper thin film. The composite separator was arranged such that the first and second porous coating layers were disposed to face the anode and the cathode, respectively. The electrode structure was wound and assembled.

A non-aqueous electrolyte of lithium hexafluorophosphate (LiPF$_6$, 1 mol) in a mixed organic solvent of ethylene carbonate (EC) and ethyl methyl carbonate (EMC) (1/2, w/w) was injected into the electrode assembly to fabricate a lithium secondary battery.

Example 2

The procedure of Example 1 was repeated, except that the first porous coating layer was formed by slot coating to have a thickness of 5.3 μm and the second porous coating layer was formed by roll coating to have a thickness of 1.5 μm. That is, the value $(T_1-T_2)/T_{tot}$ was about 0.56.

Example 3

The procedure of Example 1 was repeated, except that the first porous coating layer was formed by slot coating to have a thickness of 3.9 μm and the second porous coating layer was formed by roll coating to have a thickness of 3.1 μm. That is, the value $(T_1-T_2)/T_{tot}$ was about 0.11.

Example 4

The procedure of Example 1 was repeated, except that Li(NiMnCo)O$_2$ particles were used as cathode active material particles.

Comparative Example 1

A lithium secondary battery was fabricated in the same manner as in Example 1, except that two Mayer bars having a thickness of 0.6 mm was used to adjust the thicknesses of the coating layers coated on both surfaces of the porous membrane to the same level (3.4 μm).

Comparative Example 2

A lithium secondary battery was fabricated in the same manner as in Example 1, except that the composite separator was arranged such that the 2.6 μm thick second porous coating layer was disposed to face the anode composed of a copper (Cu) thin film coated with graphite particles, as anode active material particles, coated on the copper thin film and the 4.2 μm thick first porous coating layer was disposed to face the cathode coated with LiCoO$_2$ particles as cathode active material particles.

Comparative Example 3

The procedure of Comparative Example 1 was repeated, except that Li(NiMnCo)O$_2$ particles were used as cathode active material particles.

Evaluation of Capacities of the Batteries

The batteries fabricated in Examples 1-4 and Comparative Examples 1-3 were measured for cycle characteristics. The results are shown in Tables 1 and 2.

TABLE 1

| | Cycle conditions | Example 1 | Example 2 | Example 3 | Example 4 |
|---|---|---|---|---|---|
| Capacity retention (%) relative to design capacity | 23° C., after 300 cycles | 76.05 | 76.81 | 75.12 | 73.11 |
| | 55° C., after 250 cycles | 85.82 | 86.98 | 83.53 | 78.62 |

TABLE 2

| | Cycle conditions | Comparative Example 1 | Comparative Example 2 | Comparative Example 3 |
|---|---|---|---|---|
| Capacity retention (%) relative to design capacity | 23° C., after 300 cycles | 74.60 | 73.61 | 72.62 |
| | 55° C., after 250 cycles | 82.79 | 78.71 | 77.74 |

As can be seen from the results in Tables 1 and 2, the batteries of Examples 1-3, in which the first porous coating layer thicker than the second porous coating layer was disposed to face the anode, showed improved cycle characteristics compared to the battery of Comparative Example 1, in which the first and second porous coating layers with the same thickness were formed, and the battery of Comparative Example 2, in which the first porous coating layer thicker than the second porous coating layer was disposed to face the cathode. When the batteries of Example 4 and Comparative Example 3 using different kinds of cathode active materials were compared, the former was better in cycle characteristics than the latter.

What is claimed is:
1. An electrochemical device comprising:
(a) a composite separator comprising a porous substrate, a first porous coating layer coated on one surface of the porous substrate and composed of a mixture comprising inorganic particles and a binder polymer, and a second porous coating layer coated on the other surface of the porous substrate and composed of a mixture comprising inorganic particles and a binder polymer, wherein the first porous coating layer is thicker than the second porous coating layer;
(b) an anode disposed to face the first porous coating layer; and
(c) a cathode disposed to face the second porous coating layer,
wherein the thicknesses of the first and second porous coating layers satisfy the following relationship 1:

$$0.11 \le (T_1-T_2)/T_{tot} \le 0.56$$

wherein $T_1$ and $T_2$ represent the thicknesses of the first and second porous coating layers, respectively, and $T_{tot}$ represents the total thickness of the first and second porous coating layers, and
wherein the total thickness of the first and second porous coating layers is from 1.0 to 20.0 μm,
wherein the binder polymers are each independently selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cyanoethylpullulan, cyanoethyl polyvinyl alcohol, cyanoethyl sucrose, pullulan, and mixtures of two or more kinds thereof, and wherein the inorganic particles are each independently selected from the group consisting of $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, NiO, CaO, ZnO, $Y_2O_3$, $Al_2O_3$, $TiO_2$, SiC, $Li_3PO_4$, $Li_xTi_y(PO_4)_3$ ($0<x<2$, $0<y<3$), $Li_xAl_yTi_z(PO_4)_3$ ($0<x<2$, $0<y<1$, $0<z<3$), (LiAlTiP)$_xO_y$ ($0<x<4$, $0<y<13$), ($Li_xLa_yTiO_3$, $0<x<2$, $0<y<3$), $Li_xGe_yP_zS_w$ ($0<x<4$, $0<y<1$, $0<z<1$, $0<w<5$), $Li_xN_y$ ($0<x<4$, $0<y<2$), $Li_xSi_yS_z$ ($0<x<3$, $0<y<2$, $0<z<4$), $Li_xP_yS_z$ ($0<x<3$, $0<y<3$, $0<z<7$), and mixtures of two or more kinds thereof.

2. The electrochemical device according to claim 1, wherein the porous substrate is a porous polyolefin membrane.

3. The electrochemical device according to claim 1, wherein the porous substrate has a thickness of 1 to 100 μm.

4. The electrochemical device according to claim 1, wherein the binder polymers each independently have a solubility parameter of 15 to 45 $Mpa^{1/2}$.

5. The electrochemical device according to claim 1, wherein the inorganic particles present in each of the first and second porous coating layers have an average particle diameter of 0.001 to 10 μm.

6. The electrochemical device according to claim 1, wherein the weight ratio of the inorganic particles to the binder polymer in each of the first and second porous coating layers is from 50:50 to 99:1.

7. The electrochemical device according to claim 1, wherein the cathode comprises particles of at least one cathode active material selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z represent the atomic fractions of the corresponding constituent elements of the oxide and satisfy the relations of $0 \leq x<0.5$, $0 \leq y<0.5$, $0 \leq z<0.5$).

8. The electrochemical device according to claim 1, wherein the cathode comprises at least one cathode active material selected from the group consisting of $LiCoO_2$ and $LiNiMnCoO_2$.

9. The electrochemical device according to claim 1, wherein the anode comprises particles of at least one anode active material selected from the group consisting of natural graphite, artificial graphite, carbonaceous materials, LTO, silicon (Si), and tin (Sn).

10. The electrochemical device according to claim 1, wherein the electrochemical device is a lithium secondary battery.

* * * * *